Patented Dec. 21, 1948

2,456,937

UNITED STATES PATENT OFFICE 2,456,937

STABILIZED FAT COMPOSITIONS

Paul Gyorgy, Cleveland, and Martin B. Williamson and Eric T. Stiller, Chagrin Falls, Ohio, assignors to Wyeth Incorporated, Philadelphia, Pa., a corporation of Delaware No Drawing. Application February 29, 1944, Serial No. 524,494

15 Claims. (Cl. 99—163)

This invention relates to the stabilization of oils, fats, and food compositions containing a significant amount of fat, and particularly relates to fat-type compositions in which there has been incorporated a small amount of a sulfhydryl compound.

One object of the present invention is to retard the oxidative deterioration which gives rise to the development of rancidity, malodor, etc. in fat-type compositions.

Another object of the invention is to provide a readily available, substantially non-toxic substance that even in minor amounts is effective in retarding oxidative decomposition of fat-type edible compositions.

Other objects of the invention will become apparent hereinafter in the specification.

We have now found that organic compounds containing a sulfhydryl group or capable of forming a sulfhydryl group by enolization in the presence of water, retard oxidative deterioration of fat-type compositions provided a small amount of water is present. We have found that substantially colorless, thiourea, N-acetyl thiourea, cysteine, and thiouracil are especially effective sulfhydryl or compounds capable of forming sulfhydryl compounds for retarding oxidative deterioration of fat-type compositions when a small amount of water is also present or added. The sulfhydryl compounds are effective in retarding oxidative deterioration in the concentrations as low as about .05%.

It is our belief that the stabilizing influence of these compounds arises from the presence of the sulfhydryl group and that the effectiveness of such compounds as thiourea and thiouracil probably arises from their tautomerizing to isothiourea and isothiouracil. The belief is supported by the fact that N-substituted thioureas are effective stabilizers whereas S-substituted isothioureas are ineffective. In the case of S-substituted isothioureas there is of course no opportunity for the formation of a free sulfhydryl group through tautomerization.

The following table serves to illustrate the antioxygenic activity of certain representative compounds containing or potentially containing a sulfhydryl group. Data for S-methylisothiourea and controls is included to facilitate comparison.

Table

| Antioxidant (0.2 per cent) | $H_2O$ per cent | Iodine No. |
|---|---|---|
| Cysteine | 0 | 43.5 |
| Do | 4.65 | 114.1 |
| N-Acetylthiourea | 0 | 55.4 |
| Do | 4.65 | 128.5 |
| S-Methylisothiourea | 0 | 51.2 |
| Do | 4.65 | 50.3 |
| Thiourea | 0 | 64.5 |
| Do | 4.65 | 125.2 |
| Thiouracil | 0 | 64.8 |
| Do | 4.65 | 140.9 |
| Control (no antioxidant) | 0 | 60.5 |
| Do | 4.65 | 63.5 |

In determining the data set forth in the above table, a modified dried system was used, composed of 18 gms. of corn starch, 3.5 gms. of redistilled linoleic acid, and 43 mg. of substance to be tested. In the modifications with water, one gram of water was used to replace one gram of starch in the composition. The ingredients were thoroughly mixed and incubated at 30° C. On the eighth day the fat was extracted with chloroform and the iodine number determined.

Small amounts of the sulfhydryl compounds together with a little water may be added to various foodstuffs containing a significant amount of fat to attain a definite retardation of oxidative deterioration. Thus the sulfhydryl compounds may be added in small amounts to milk before converting the same to an almost dry state by means of spray drying or other suitable evaporative procedures. Together with a little water they may be incorporated in small amounts for protective purposes in dry milks, such as skim milk powder containing milk fats with or without added other fats. The sulfhydryl compounds with water likewise may be used to hinder the development of rancidity in mixed fat compositions, such as one containing beef fats, cocoanut oil, cod liver oil, and partially hydrogenated soybean oil or one containing tallow, oleo oil, and soya bean oil. Butter and lard may thus be protected as well as various oils, such as cottonseed, castor, sesame, peanut, olive, teaseed, palm, cocoanut, corn, soya bean, shark, cod liver, halibut liver, mackerel, etc. Other fat containing foods to which the invention is applicable are fatty meats, such as bacon, fatty emulsions in water, such as milk, cream, ice cream, mayonnaise, nuts, coffee, etc.

The following table serves to illustrate specifically the protective action of the combination of thiourea and water in food compositions such as dry milk containing various fats.

*Effect of 0.1% thiourea on the inhibition of rancidity of various fats in dried skim milk medium containing 2% $H_2O$*

|  | Days of Protection ||
|---|---|---|
|  | Control | Thiourea |
| Mixture A (100% butter fat) | 28 | 62 |
| Mixture B (55% beef fats, 15% cocoanut oil, 10% cod liver oil, 20% cocoa butter) | 19 | 47 |
| Mixture C (55% beef fats, 45% soybean oil) | 82 | 96+ |
| Mixture D (50% butter fat, 10% beef fats, 20% soybean oil, 10% cod liver oil, 10% cocoa butter) | 28 | 48 |

It is important that metal salts, such as copper or ferric salts, not be added to the compositions of the invention inasmuch as such salts in amounts greater than that normally present in compositions such as dried milk apparently destroy the effectiveness of the sulfhydryl compounds in retarding the autoxidation of fat-type compositions. The amount of water in the compositions may of course be varied considerably, about one to two percent of water at least being present and greater amounts being determined largely by the amount of water present in the foodstuff being treated.

Obviously, if care is taken to select substantially odorless sulfhydryl type compounds, the teachings of the present invention may be applied advantageously to the stabilization of essential oils, such as oils of lemon, orange, peppermint, wintergreen, cloves, sassafras, etc. and creams of the vanishing, cold, shaving, and depilatory types.

As many apparently widely different embodiments of this invention may be made without departing from the spirit and scope thereof, it is to be understood that we do not limit ourselves to the above description except as defined in the appended claims.

We claim:

1. An edible composition of matter comprising an edible substance containing a significant percentage of fats, and an antioxidant comprising a non-toxic, effective proportion of an organic sulfhydryl compound and at least about 1% by weight of water.

2. An edible composition of matter comprising an edible substance containing a significant percentage of fats, and an antioxidant comprising a non-toxic, effective proportion of an organic sulfur compound containing an unsubstituted amino group, said compound being capable of enolizing in the environment of the composition to furnish a sulfhydryl group and at least about 1% by weight of water.

3. An edible composition of matter comprising an edible substance containing a significant percentage of fats, and an antioxidant comprising a non-toxic, effective proportion of thiourea and at least about 1% by weight of water.

4. A composition of matter comprising a substance containing a significant percentage of fats, and an antioxidant comprising a non-toxic, effective proportion of cysteine and at least about 1% by weight of water.

5. An edible composition of matter comprising an edible substance containing a significant percentage of fats, and an antioxidant comprising a non-toxic, effective proportion of N-acylthiourea and at least about 1% by weight of water.

6. An edible composition of matter comprising an edible substance containing a significant percentage of fats, and an antioxidant comprising a non-toxic, effective proportion, and N-acetylthiourea and at least about 1% by weight of water.

7. A composition of matter comprising tallow, oleo oil, soya bean oil, and an antioxidant comprising a non-toxic, effective proportion of an organic sulfhydryl compound and at least about 1% by weight of water.

8. A composition of matter comprising milk solids, a fat, and an antioxidant comprising a non-toxic, effective proportion of an organic sulfhydryl compound and at least about 1% by weight of water.

9. A composition of matter comprising tallow, oleo oil, soya bean oil, and an antioxidant comprising a non-toxic, effective proportion of thiourea and at least about 1% by weight of water.

10. A composition of matter comprising milk solids, a fat, and an antioxidant comprising a non-toxic, effective proportion of thiourea and at least about 1% by weight of water.

11. A composition of matter comprising tallow, oleo oil, soya bean oil, and an antioxidant comprising a non-toxic, effective proportion of cysteine and at least about 1% by weight of water.

12. A composition of matter comprising milk solids, a fat, and an antioxidant comprising a non-toxic, effective proportion of cysteine and at least about 1% by weight of water.

13. A composition of matter comprising tallow, oleo oil, soya bean oil, and an antioxidant comprising a non-toxic, effective proportion of N-acetylthiourea and at least about 1% by weight of water.

14. A composition of matter comprising milk solids, a fat, and an antioxidant comprising a non-toxic, effective proportion of N-acetylthiourea and at least about 1% by weight of water.

15. An edible composition of matter comprising an edible substance containing a significant percentage of free fat and an antioxidant consisting substantially only of at least about 1% by weight of water and an organic sulfur compound selected from the group consisting of an organic sulfhydryl and a sulfur compound containing an unsubstituted amino group, said compound being capable of enolizing in the environment of the composition to furnish a sulfhydryl group.

PAUL GYORGY.
MARTIN B. WILLIAMSON.
ERIC T. STILLER.

REFERENCES CITED

The following references are of record in the file of this patent:

UNITED STATES PATENTS

| Number | Name | Date |
|---|---|---|
| 2,154,341 | Martin | Apr. 11, 1939 |

FOREIGN PATENTS

| Number | Country | Date |
|---|---|---|
| 487,094 | Great Britain | 1938 |

OTHER REFERENCES

National Cottonseed Products Assoc. Rules, 1944, page 57.